US009325443B2

United States Patent
Kishiyama et al.

(10) Patent No.: US 9,325,443 B2
(45) Date of Patent: Apr. 26, 2016

(54) RADIO BASE STATION APPARATUS, MOBILE TERMINAL DEVICE AND WIRELESS COMMUNICATION METHOD

(75) Inventors: Yoshihisa Kishiyama, Yokosuka (JP); Kazuaki Takeda, Kanagawa (JP); Yusuke Ohwatari, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 565 days.

(21) Appl. No.: 13/519,895

(22) PCT Filed: Jan. 5, 2011

(86) PCT No.: PCT/JP2011/050036
§ 371 (c)(1),
(2), (4) Date: Aug. 17, 2012

(87) PCT Pub. No.: WO2011/083795
PCT Pub. Date: Jul. 14, 2011

(65) Prior Publication Data
US 2012/0300652 A1 Nov. 29, 2012

(30) Foreign Application Priority Data
Jan. 6, 2010 (JP) .................................. 2010-001139

(51) Int. Cl.
*H04J 11/00* (2006.01)
*H04L 1/20* (2006.01)
(Continued)

(52) U.S. Cl.
CPC ............ *H04J 11/003* (2013.01); *H04J 11/0026* (2013.01); *H04L 1/20* (2013.01); *H04L 5/0051* (2013.01); *H04L 5/0073* (2013.01);
(Continued)

(58) Field of Classification Search
CPC ... H04L 5/0048; H04L 5/0057; H04L 5/0053; H04L 5/0023; H04L 1/0026; H04B 7/0626
See application file for complete search history.

(56) References Cited

U.S. PATENT DOCUMENTS 7,697,409 B2   4/2010 Larsson
2004/0266358 A1* 12/2004 Pietraski et al. ........... 455/67.11
(Continued)

FOREIGN PATENT DOCUMENTS

JP   2004096186 A   3/2004
JP   2008-524957 A   7/2008
JP   2009544249 A   12/2009

OTHER PUBLICATIONS

Office Action in corresponding Japanese application No. 2010-001139 date Apr. 23, 2013 (4 pages).
(Continued)

*Primary Examiner* — Jung Park
(74) *Attorney, Agent, or Firm* — Osha Liang LLP

(57) ABSTRACT

To provide a radio base station apparatus, mobile terminal device and wireless communication method for transmitting and receiving downlink channel quality measurement reference signals in consideration of interference estimation of high accuracy, in a wireless communication method of the invention, a radio base station apparatus generates channel quality measurement reference signals, and maps the channel quality measurement reference signals to two adjacent symbols, and a mobile terminal device receives a downlink signal including the channel quality measurement reference signals mapped to two adjacent symbols, and performs interfering power estimation using the channel quality measurement reference signals mapped to two adjacent symbols.

10 Claims, 5 Drawing Sheets

(51) Int. Cl.

| | | |
|---|---|---|
| H04W 8/24 | (2009.01) | |
| H04W 24/10 | (2009.01) | |
| H04W 28/04 | (2009.01) | |
| H04W 48/08 | (2009.01) | |
| H04W 88/08 | (2009.01) | |
| H04L 5/00 | (2006.01) | |

(52) U.S. Cl.
CPC ........... *H04J11/0059* (2013.01); *H04L 5/0023* (2013.01); *H04L 5/0039* (2013.01); *H04L 5/0057* (2013.01); *H04L 5/0082* (2013.01); *H04W 8/24* (2013.01); *H04W 24/10* (2013.01); *H04W 28/048* (2013.01); *H04W 48/08* (2013.01); *H04W 88/08* (2013.01)

(56) References Cited

U.S. PATENT DOCUMENTS

| | | | |
|---|---|---|---|
| 2008/0013500 | A1 | 1/2008 | Laroia et al. |
| 2010/0254471 | A1* | 10/2010 | Ko et al. ............... 375/260 |
| 2011/0244877 | A1* | 10/2011 | Farajidana et al. ........ 455/452.2 |
| 2012/0002740 | A1* | 1/2012 | Han et al. ............... 375/260 |
| 2012/0027120 | A1* | 2/2012 | Noh ................ H04L 1/0026 375/295 |
| 2012/0120903 | A1* | 5/2012 | Kim et al. ............... 370/329 |
| 2014/0334453 | A1* | 11/2014 | Ko et al. ............... 370/335 |

OTHER PUBLICATIONS

Office Action issued in corresponding Japanese Application No. 2010-001139, mailed Jul. 30, 2013 (2 pages).

Office Action in counterpart Japanese Patent Application No. 2013-222040, mailed Aug. 26, 2014 (6 pages).

Samsung; "Discussions on CSI-RS for LTE-Advanced"; 3GPP TSG RAN WG1 #59, R1-094574; Jeju, Korea; Nov. 9-13, 2009 (6 pages).

Notification of Reasons for Rejection for Japanese Application No. 2010-001139 dated Feb. 12, 2013, with English translation thereof (6 pages).

3GPP TSG RAN WG1 Meeting #58bis, R1-094339, "DL CSI-RS Design for LTE-Advanced," NTT DOCOMO; Miyazaki, Japan, Oct. 12-16, 2009 (7 pages).

3GPP TSG-RAN WG1 #59, R1-094867, "Details of CSI-RS," Qualcomm Europe; Jeju, Korea, Nov. 9-13, 2009 (6 pages).

3GPP TSG-RAN WG1 #59, R1-094437, "On CSI RS Design Considerations," Ericsson, ST-Ericsson; Jeju, South Korea, Nov. 9-13, 2009 (3 pages).

3GPP TSG-RAN WG1 #59bis, R1-094941, "Considerations on CSI RS design in LTE-A," Fujitsu; Jeju, Korea, Nov. 9-13, 2009 (11 pages).

Office Action issued in corresponding Japanese Application No. 2013-222040, mailed Jan. 20, 2015 (6 pages).

International Search Report w/translation from PCT/JP2011/050036 dated Feb. 1, 2011 (3 pages).

3GPP TSG RAN WG1 #58bis, R1-093909; "Multi-cell CSI-RS design aspects"; Nokia et al.; Miyazaki, Japan; Oct. 12-16, 2009 (11 pages).

3GPP TSG RAN WG1 Meeting #58bis, R1-093910; "Multi-cell CSI-RS transmission and related impact to LTE Rel'8"; Nokia et al.; Miyazaki, Japan; Oct. 12-16, 2009 (10 pages).

3GPP TS 36.211 V8.8.0; "3rd Generation Partnership Project; Technical Specification Group Radio Access Network; Evolved Universal Terrestrial Radio Access (E-UTRA); Physical Channels and Modulation (Release 8)"; Sep. 2009 (83 pages).

Decision to Grant a Patent issued in related Japanese Application No. 2013-222040, mailed Jun. 30, 2015 (4 pages).

\* cited by examiner

RADIO BASE STATION APPARATUS, MOBILE TERMINAL DEVICE AND WIRELESS COMMUNICATION METHOD

TECHNICAL FIELD

The present invention relates to a radio base station apparatus, mobile terminal device and wireless communication method.

BACKGROUND ART

In LTE (Long Term Evolution) systems specified in the 3GPP ($3^{rd}$ Generation Partnership Project), a reference signal (RS) is arranged in a resource block (RB). For example, a mobile terminal device receives the reference signal, and is thereby capable of performing coherent detection (Non-patent Document 1). The reference signal is scrambled (randomized by a known signal sequence) by cell-specific scrambling signal.

The 3GPP has studied LTE-A (LTE-Advanced) systems to actualize high-speed transmission in wider coverage than in the LTE system. In the LTE-A system, two types of reference signals (Demodulation Reference Signal (DM-RS) and channel quality measurement reference signal (CSI-RS)) are specified in downlink.

The demodulation reference signal is used in demodulation of the Physical Downlink Shared Channel (PDSCH). The demodulation reference signal is subjected to the same precoding as in the PDSCH and is transmitted to a mobile terminal device. The channel quality measurement reference signal is used in measuring channel quality information (Channel State Indicator) that the mobile terminal device transmits to the radio base station apparatus as feedback.

CITATION LIST

Non-Patent Literature

[Non-patent Literature 1] 3GPP, TS36.211

SUMMARY OF INVENTION

Technical Problems

The LTE-A system requires interference estimation with higher accuracy than in the LTE system. Accordingly, in the LTE-A system, it is necessary to design the configuration of the downlink channel quality measurement reference signal so as to satisfy such a requirement.

The present invention was made in view of the respect, and it is an object of the invention to provide a radio base station apparatus, mobile terminal device and wireless communication method for transmitting and receiving downlink channel quality measurement reference signals in consideration of interference estimation of high accuracy.

Solution to the Problems

A radio base station apparatus of the invention is characterized by having generation means for generating channel quality measurement reference signals, and mapping means for mapping the channel quality measurement reference signals to two adjacent symbols.

A radio base station apparatus of the invention is characterized by having generation means for generating a channel quality measurement reference signal, mapping means for mapping the channel quality measurement reference signal to a particular symbol, and puncture means for puncturing a predetermined subcarrier in the particular symbol.

TECHNICAL ADVANTAGE OF THE INVENTION

According to the invention, it is possible to transmit and receive downlink channel quality measurement reference signals in consideration of interference estimation of high accuracy.

BEST MODE FOR CARRYING OUT THE INVENTION

Figure 1:
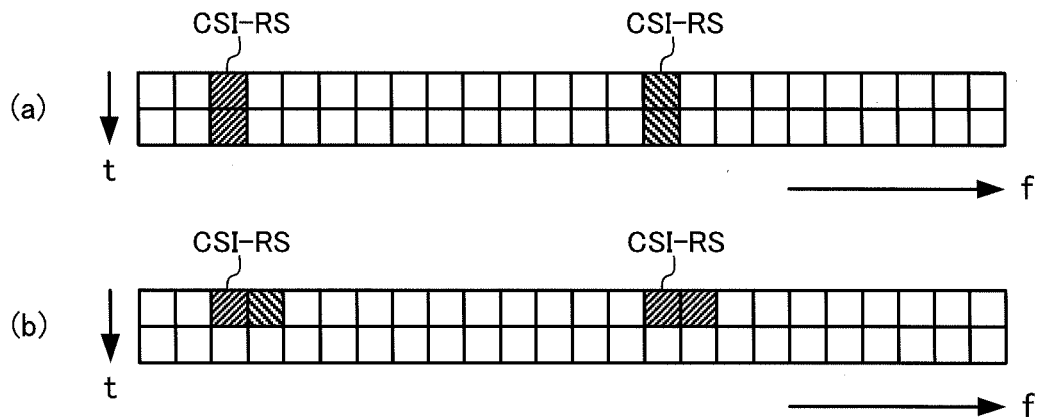
FIGS. 1(a) and 1(b) are diagrams to explain mapping of CSI-RSs according to the invention.

An Embodiment of the invention will specifically be described below with reference to accompanying drawings.

A mobile terminal device estimates a reception propagation channel to a serving cell using a channel quality measurement reference signal (CSI-RS). Further, the mobile terminal device estimates interference from adjacent cells using CSI-RSs.

In the case of estimating interference using CSI-RSs, the mobile terminal device obtains interfering power from a difference between two CSI-RSs. When two CSI-RSs used in estimating interfering power are mapped away from each other in the frequency domain/time domain, since channel states are different in respective mapping positions, it is not possible to estimate interference with high accuracy in estimating interfering power from a difference between two CSI-RSs.

In consideration of such interference estimation of high accuracy, the inventors of the invention studied arrangements of downlink channel quality measurement reference signals and reached completion of the invention.

In other words, it is the gist of the invention to generate CSI-RSs, and maps the CSI-RSs to two adjacent symbols, or to generate a CSI-RS, map the CSI-RS to a particular symbol, and puncture a predetermined subcarrier in the particular symbol.

In the invention, as CSI-RS mapping for interference estimation of high accuracy, there are the following two aspects.

(1) In a first aspect, CSI-RSs are mapped to two adjacent symbols. In this case, as shown in FIG. 1(a), the CSI-RSs may be mapped to two symbols adjacent in time. Alternatively, as shown in FIG. 1(b), the CSI-RSs may be mapped to two symbols adjacent in frequency. As the fading variation between two adjacent symbols is smaller, it is possible to perform interference estimation with more excellence, and therefore, mapping using two symbols adjacent in the time domain as the former case is suitable for application to a low-speed mobile environment.

FIGS. 1(a) and 1(b) illustrate the case of mapping CSI-RSs to two symbols adjacent in time or two symbols adjacent in frequency as a pair, but the invention is not limited thereto, and CSI-RSs may be mapped to two symbols close in frequency or time, or CSI-RSs may be mapped to two symbols adjacent in time as a pair. In this case, symbols close in frequency or time mean two symbols having equal channel states to the extent sufficient to estimate interfering power with high accuracy.

Thus, by mapping CSI-RSs to two symbols adjacent in time or two symbols adjacent infrequency as a pair, the channel states in the mapping positions of respective CSI-RSs become nearly equal, and when interfering power is estimated from a difference between two CSI-RSs, it is possible to estimate interference with high accuracy.

(2) In a second aspect, a CSI-RS is mapped to a particular symbol, and a predetermined subcarrier in the particular symbol is punctured. In other words, a predetermined subcarrier in the OFDM symbol to which the CSI-RS is multiplexed is punctured. In this case, as shown in FIG. 2(a), a subcarrier away from the CSI-RS may be punctured, or as shown in FIG. 2(b), a subcarrier adjacent (close) to the CSI-RS may be punctured.

By thus mapping a CSI-RS to a particular symbol, and puncturing a predetermined subcarrier in the particular symbol, it is possible to make a portion of the predetermined subcarrier a reference irrespective of the channel state, and when interfering power is estimated from a difference between two CSI-RSs, it is possible to estimate interference with high accuracy.

Figure 3:
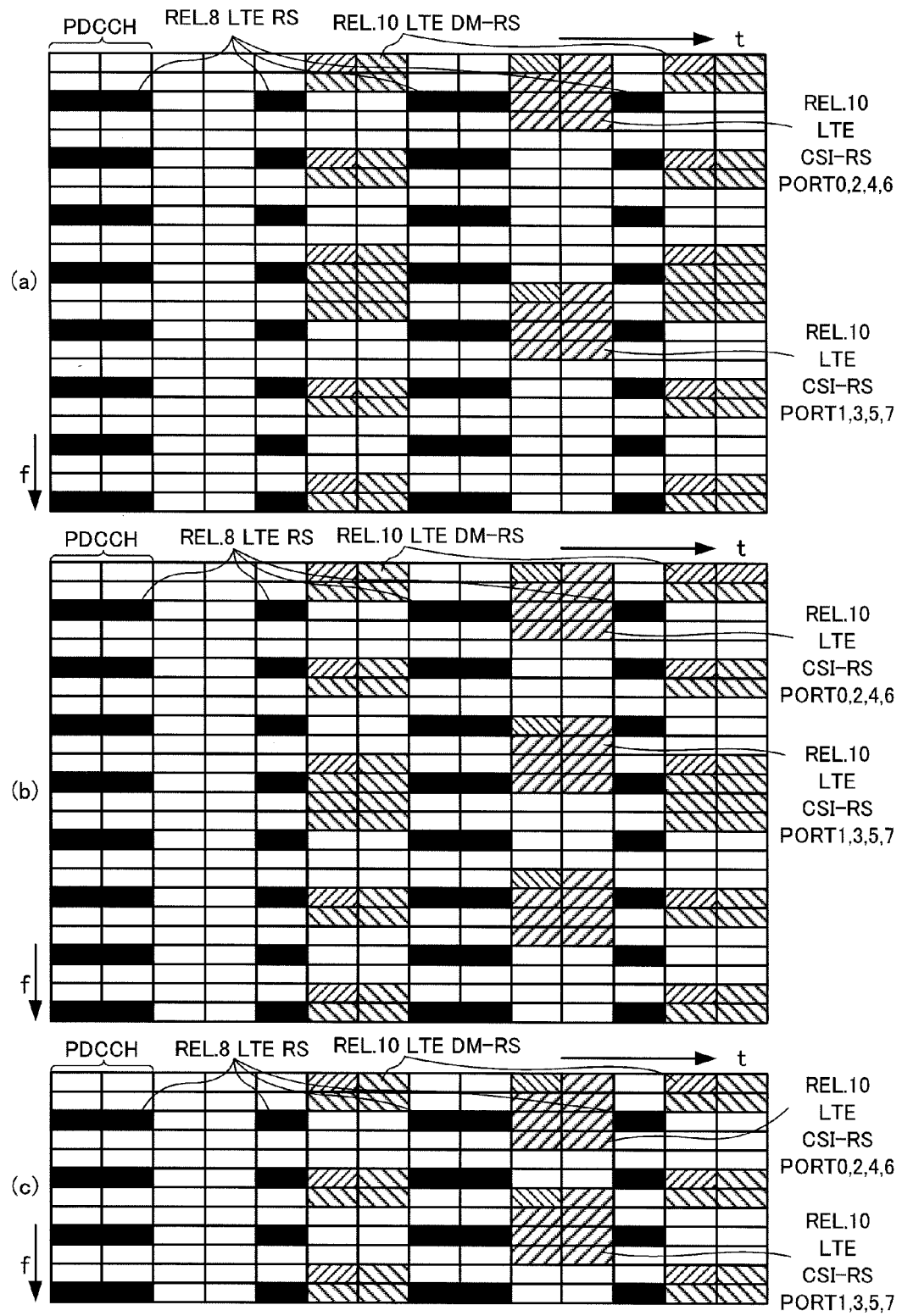
FIGS. 3(a) and 3(c) are diagrams to explain mapping of CSI-RSs according to the invention.

FIGS. 3(a) to 3(c) show an example of mapping CSI-RSs in the first aspect. The reference signal arrangement patterns as shown in FIGS. 3(a) to 3(c) are arrangement patterns of FDM (Frequency Division Multiplex) or TDM (Time Division Multiplex). The arrangement pattern as shown in FIG. 3(a) is an arrangement pattern of 24-subcarrier cycle, the arrangement pattern as shown in FIG. 3(b) is an arrangement pattern of 16-subcarrier cycle, and the arrangement pattern as shown in FIG. 3(c) is an arrangement pattern of 12-subcarrier cycle.

In FIGS. 3(a) to 3(c), black portions are Release 8 LTE reference signal portions, portions of oblique lines from bottom left to top right are Release 10 LTE DM-RS portions, and portions of oblique lines from bottom right to top left are CSI-RS portions specified in the invention. As can be seen from FIGS. 3(a) to 3(c), CSI-RSs are mapped to two symbols adjacent in time (CSI-RS pair), and CSI-RS pairs corresponding to eight transmission antennas (port 0-7) are mapped to subcarriers. Herein, CSI-RSs of ports 0, 2, 4, 6 are mapped to four contiguous subcarriers, and CSI-RSs of ports 1, 3, 5, 7 are mapped to four contiguous subcarriers.

By thus mapping CSI-RSs to two adjacent symbols, or mapping a CSI-RS to a particular symbol and puncturing a predetermined subcarrier in the particular symbol, it is possible to estimate interference with high accuracy when interfering power is estimated from a difference between two CSI-RSs.

Figure 4:
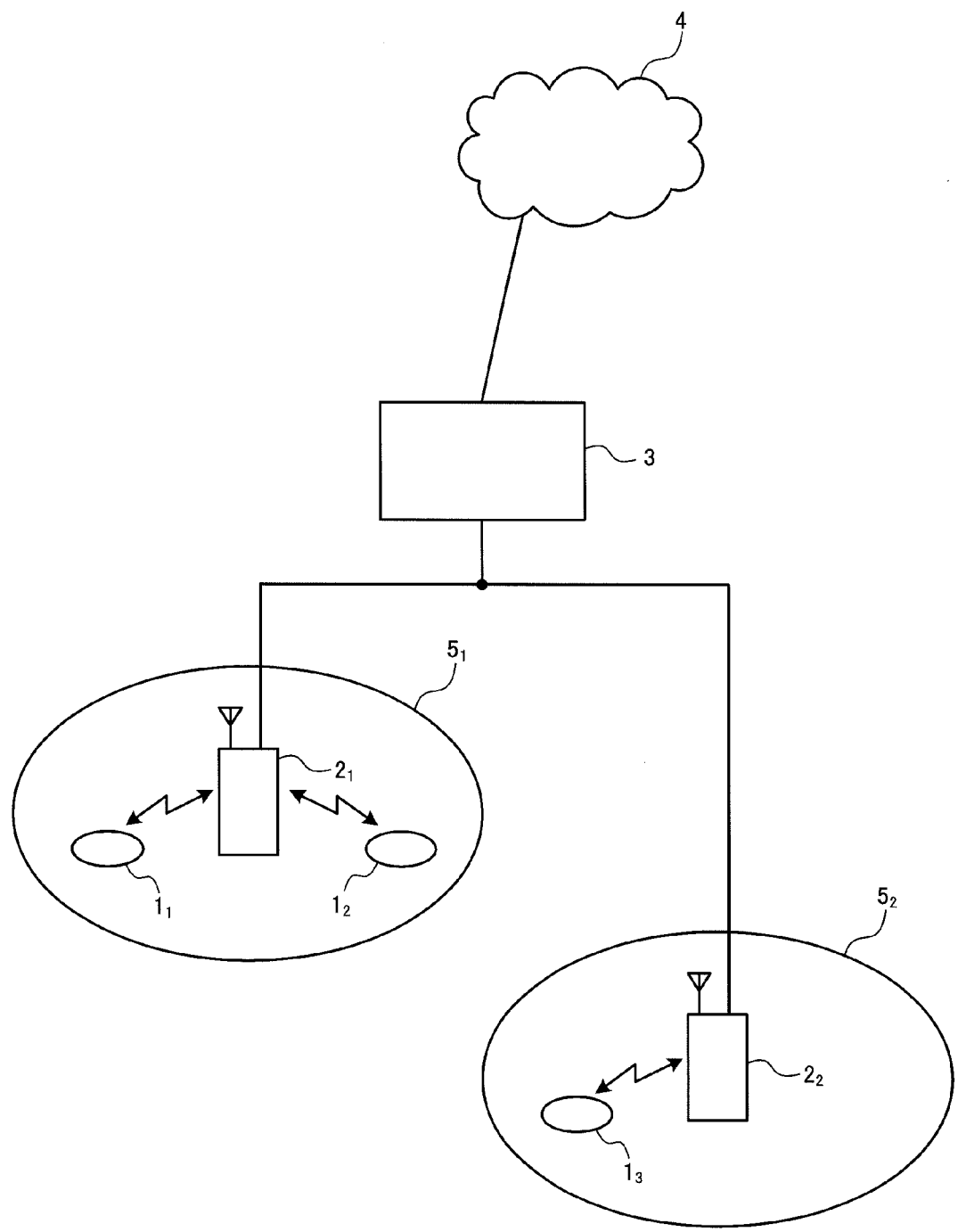
FIG. 4 is a diagram illustrating a wireless communication system having radio base station apparatuses and mobile terminal devices according to the Embodiment of the invention.

FIG. 4 is a diagram illustrating a wireless communication system having the radio base station apparatus and the mobile terminal device according to the Embodiment of the invention.

The wireless communication system is a system to which, for example, E-UTRA (Evolved UTRA and UTRAN) is applied. The wireless communication system is provided with base station apparatuses (eNB: eNodeB) 2 ($2_1$, $2_2$, ..., $2_l$, l is an integer where l>0) and a plurality of mobile terminal devices (UE) $1_n$ ($1_1$, $1_2$, $1_3$, ..., $1_n$, n is an integer where n>0) that communicate with the radio base station apparatuses 2. The radio base station apparatuses 2 are connected to an upper station, for example, an access gateway apparatus 3, and the access gateway apparatus 3 is connected to a core network 4. The mobile terminal $1_n$ communicates with the radio base station apparatus 2 in a cell 5 ($5_1$, $5_2$) by E-UTRA. This Embodiment shows two cells, but the invention is similarly applicable to three cells or more. In addition, each of the mobile terminal devices ($1_1$, $1_2$, $1_3$, ..., $1_n$) has the same configuration, function and state, and is described as a mobile terminal device $1_n$ unless otherwise specified in the following description.

In the wireless communication system, as a radio access scheme, OFDM (Orthogonal Frequency Division Multiplexing) is applied in downlink, while SC-FDMA (Single-Carrier Frequency Division Multiple Access) is applied in uplink. Herein, OFDM is a multicarrier transmission scheme for dividing a frequency band into a plurality of narrow frequency bands (subcarriers), and mapping data to each subcarrier to perform communication. SC-FDMA is a single-carrier transmission scheme for dividing a frequency band for each terminal so that a plurality of mobile terminal devices uses mutually different frequency bands, and thereby reducing interference among the mobile terminal devices.

Described Herein are Communication Channels in E-UTRA.

In downlink, used are the Physical Downlink Shared Channel (PDSCH) shared among the mobile terminal devices $1_n$, and the Physical Downlink Control Channel (PDCCH). The Physical Downlink Control Channel is also called the downlink L1/L2 control channel. User data i.e. normal data signals are transmitted on the Physical Downlink Shared Channel. Meanwhile, on the Physical Downlink Control Channel are transmitted downlink scheduling information (DL Scheduling Information), acknowledgement/negative acknowledgement information (ACK/NACK), uplink scheduling grant (UL Scheduling Grant), TPC command (Transmission Power Control Command), etc. For example, the downlink scheduling information includes an ID of a user to perform communications using the Physical Downlink Shared Channel, information of a transport format of the user data, i.e. information on the data size, modulation scheme, and retransmission control (HARQ: Hybrid ARQ), downlink resource block assignment information, etc.

Meanwhile, for example, the uplink scheduling grant includes an ID of a user to perform communications using the Physical Uplink Shared Channel, information of a transport format of the user data, i.e. information on the data size and modulation scheme, uplink resource block assignment information, information on transmission power of the uplink shared channel, etc. Herein, the uplink resource block corresponds to frequency resources, and is also called the resource unit.

Further, the acknowledgement/negative acknowledgement information (ACK/NACK) is acknowledgement/negative acknowledgement information concerning the shared channel in uplink. The content of acknowledgement/negative acknowledgement information is expressed by Acknowledgement (ACK) indicating that the transmission signal is properly received or Negative Acknowledgement (NACK) indicating that the transmission signal is not properly received.

In uplink, used are the Physical Uplink Shared Channel (PUSCH) shared among the mobile terminal devices $1_n$, and the Physical Uplink Control Channel (PUCCH). User data i.e. normal data signals are transmitted on the Physical Uplink Shared Channel. Meanwhile, on the Physical Uplink Control Channel is transmitted downlink quality information used in scheduling processing of the physical shared channel in downlink and adaptive modulation/demodulation and coding processing, and acknowledgement/negative acknowledgement information of the Physical Downlink Shared Channel.

On the Physical Uplink Control Channel, a scheduling request to request resource allocation of the uplink shared channel, release request in persistent scheduling and the like may be transmitted, in addition the CQI and acknowledgement/negative acknowledgement information. Herein, resource allocation of the uplink shared channel means that a radio base station apparatus notifies a mobile terminal device that the mobile terminal device is allowed to perform communications using an uplink shared channel in a subsequent subframe, using the Physical Downlink Control Channel in some subframe.

The mobile terminal device $1_n$ communicates with an optimal radio base station apparatus. In the example of FIG. 4, mobile terminal devices $1_1$ and $1_2$ communicate with a radio base station apparatus $2_1$, and a mobile terminal device $1_3$ communicates with a radio base station apparatus $2_2$.

Figure 5:
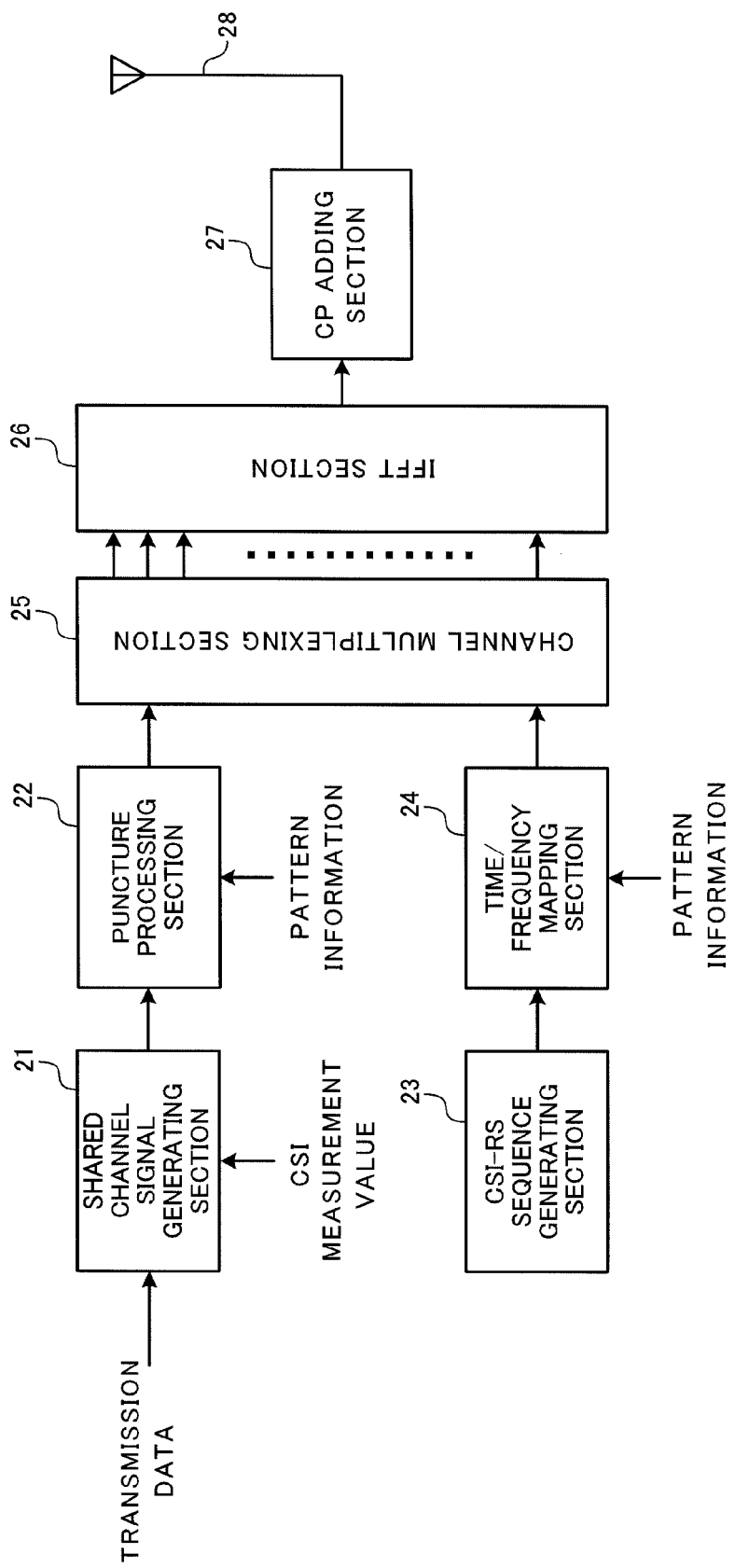
FIG. 5 is a block diagram illustrating a schematic configuration of the radio base station apparatus according to the Embodiment of the invention.

FIG. 5 is a diagram illustrating a configuration of the radio base station apparatus according to the Embodiment of the invention. FIG. 5 illustrates only the transmission section, but as a matter of course, the radio base station apparatus is provided with the reception section for performing reception processing on uplink signals.

The radio base station apparatus as shown in FIG. 5 is mainly comprised of a shared channel signal generating section that generates a shared channel signal, a puncture processing section 22 that performs puncture processing on a shared channel signal, a CSI-RS sequence generating section 23 that generates a CSI-RS sequence, a time/frequency mapping section 24 that maps the CSI-RS in the time domain/ frequency domain, a channel multiplexing section 25 that multiplexes the shared channel signal and a signal including the CSI-RS, an IFFT (Inverse Fast Fourier Transform) section 26 that performs IFFT on the multiplexed signal, a CP (Cyclic Prefix) adding section that adds a CP to the IFFT-processed signal, and a transmission antenna 28. In addition, the radio base station apparatus is capable of performing MIMO transmission using a plurality of transmission antennas, but to simplify the description, FIG. 5 shows the configuration of one transmission antenna.

The shared channel signal generating section 21 generates a shared channel signal (signal transmitted on the PDSCH) using downlink transmission data. The shared channel signal generating section 21 generates the shared channel signal based on a CSI measurement value measured in the radio base station apparatus using a CSI-RS included in an uplink signal. The shared channel signal generating section 21 outputs the generated shared channel signal to the puncture processing section 22.

The puncture processing section 22 performs puncture processing on the generated shared channel signal. As shown in FIGS. 2(a) and 2(b), the section 22 punctures a predetermined subcarrier in the OFDM symbol into which the CSI-RS is multiplexed. The predetermined subcarrier to perform the puncture processing is based on beforehand determined pattern information. The puncture processing section 22 outputs the shared channel signal subjected to the puncture processing to the channel multiplexing section 25.

The CSI-RS sequence generating section 23 generates the CSI-RS to multiplex into an RB. The CSI-RS sequence generating section 23 outputs the CSI-RS to the time/frequency mapping section 24.

The time/frequency mapping section 24 maps the CSI-RS to the time domain/frequency domain in the RB. The time/ frequency mapping section 24 maps CSI-RSs to two adjacent symbols or maps a CSI-RS to a particular symbol. In other words, in the first aspect, the time/frequency mapping section 24 maps CSI-RSs to two symbols adjacent in time as shown in FIG. 1(a), or maps CSI-RSs to two symbols adjacent in frequency as shown in FIG. 1(b). Meanwhile, in the second aspect, the time/frequency mapping section 24 maps a CSI-RS to a particular symbol as shown in FIGS. 2(a) and 2(b). The RB to map the CSI-RS is based on beforehand determined pattern information. The time/frequency mapping section 24 outputs the mapped signal to the channel multiplexing section 25.

The channel multiplexing section 25 performs channel multiplexing on the shared channel signal and the signal including the CSI-RS. The channel multiplexing section outputs the channel-multiplexed signal to the IFFT section 26. The IFFT section 26 performs IFFT on the channel-multiplexed signal to transform into the signal in the time domain. The IFFT section 26 outputs the IFFT-processed signal to the CP adding section 27. The CP adding section 27 adds a CP to the IFFT-processed signal. The signal provided with the CP is transmitted to each mobile terminal device from the transmission antenna 28 in downlink (Physical Downlink Shared Channel).

Figure 6:
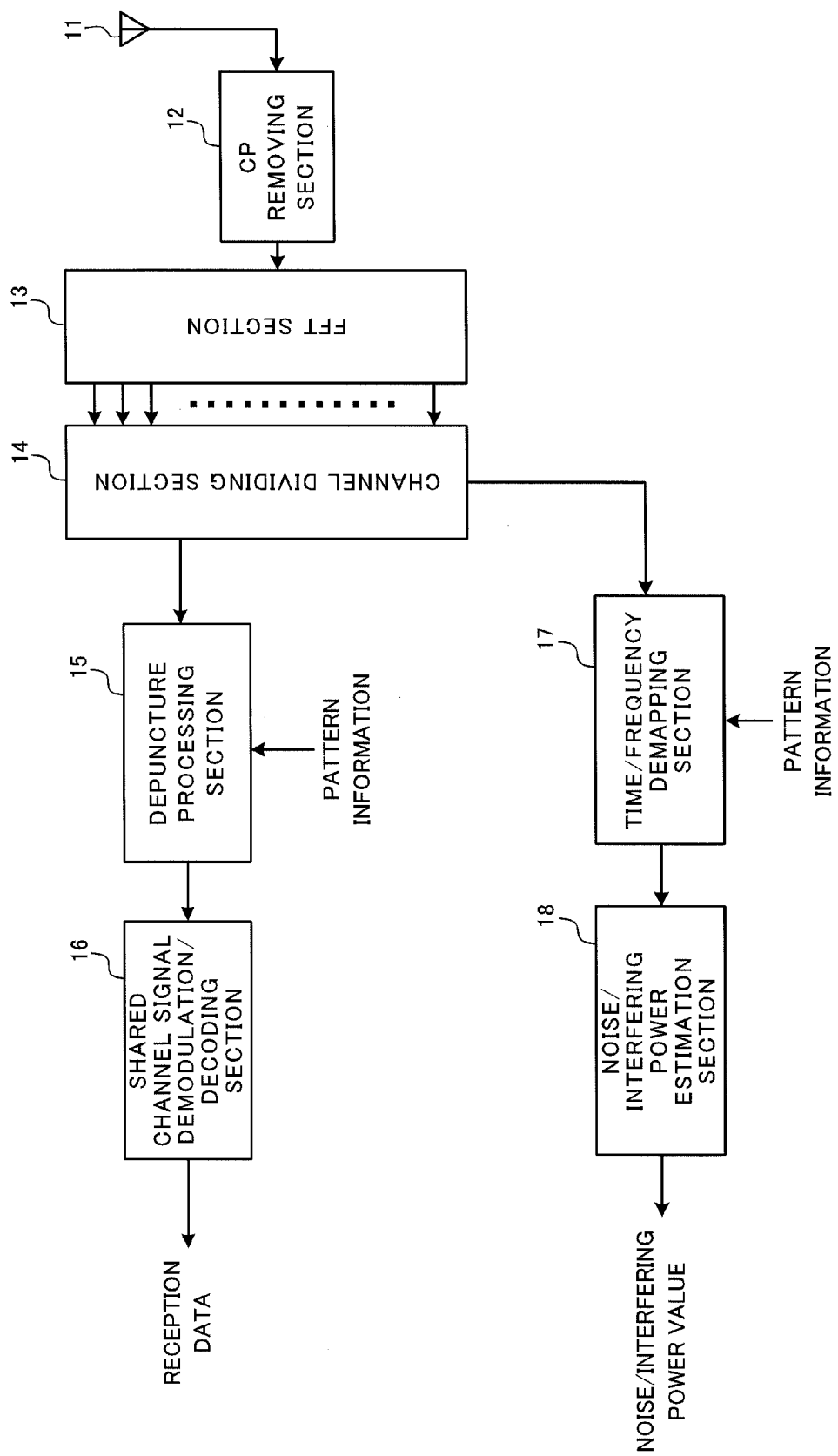
FIG. 6 is a block diagram illustrating a schematic configuration of the mobile terminal device according to the Embodiment of the invention.

FIG. 6 is a diagram illustrating a configuration of the mobile terminal device according to the Embodiment of the invention. The mobile terminal device as shown in FIG. 6 is mainly comprised of a reception antenna 11, a CP removing section 12 that removes a CP from a reception signal, an FFT (Fast Fourier Transform) section 13 that performs FFT on the CP-removed signal, a channel dividing section 14 that divides into a shared channel signal and a signal including a CSI-RS, a depuncture processing section 15 that performs depuncture processing on the shared channel signal, the shared channel signal demodulation/decoding section 16 that demodulates and decodes the shared channel signal subjected to the depuncture processing, a time/frequency demapping section that demaps the CSI-RS mapped in the time domain/frequency domain, and a noise/interfering power estimation section 18 that estimates interfering power using the demapped CSI-RS.

The signal transmitted from the radio base station apparatus in downlink (Physical Downlink Shared Channel) is received via the reception antenna 11 of the mobile terminal device. The CP removing section 12 removes the CP from the reception signal. The CP removing section 12 outputs the CP-removed signal to the FFT section 13. The FFT section 13 performs FFT on the CP-removed signal to transform into the signal in the frequency domain. The FFT section 13 outputs the FFT-processed signal to the channel dividing section 14. The channel dividing section 14 performs channel-dividing on the shared channel signal and the signal including the CSI-RS. The channel dividing section 14 outputs the signals subjected to channel dividing to the depuncture processing section 15.

The depuncture processing section 15 performs the depuncture processing on the shared channel signal subjected to channel dividing. The depuncture processing section 15 performs the depuncture processing on the shared channel signal based on the pattern information. The depuncture processing section 15 outputs the shared channel signal subjected to the depuncture processing to the shared channel signal demodulation/decoding section 16. In addition, the pattern information (control information) may be notified from the radio base station apparatus to the mobile terminal device on the broadcast channel (BCH), may be transmitted as an L1/L2 control signal, or may be notified by a higher layer. The shared channel signal demodulation/decoding section 16 demodulates and decodes the depunctured shared channel signal to obtain reception data.

The time/frequency demapping section 17 demaps the CSI-RS from the time domain/frequency domain in the RB. The RB to demap the CSI-RS is based on the beforehand determined pattern information. The time/frequency demapping section 17 outputs the demapped signal to the noise/interfering power estimation section 18. In addition, the pattern information (control information) may be notified from the radio base station apparatus to the mobile terminal device on the broadcast channel (BCH), may be transmitted as an L1/L2 control signal, or may be notified by a higher layer.

The noise/interfering power estimation section 18 estimates noise/interfering power using the demapped CSI-RS to output a noise/interfering power value. In the case of the first aspect, the noise/interfering power estimation section 18 estimates noise/interfering power with a difference between two CSI-RSs adjacent in frequency or time. For example, in the case of estimating noise/interfering power with a difference between two CSI-RSs adjacent in time, the square of the difference between two adjacent CSI-RSs is as follows:

$$|y_{TX\#i\text{-}RX\#j}(f,t) - y_{TX\#i\text{-}RX\#j}(f,t+1)|^2$$

Herein, $y_{TX\#i\text{-}RX\#j}$ represents a reception signal which is transmitted from a transmission antenna Tx#i of the radio base station apparatus and received in a reception antenna Rx#j of the mobile terminal device.

Noise of each received CSI-RS is not correlated, and therefore, by averaging, the noise/interfering power is $2(P_N+P_I)$. Accordingly, with respect to the reception signal, by averaging in the entire band over all the transmission and reception antennas, it is possible to estimate noise/interfering power in the reception antenna Rx#j of the mobile terminal device. In other words, by following equation 1, it is possible to estimate noise/interfering power in the reception antenna Rx#j.

$$P_{N,RX\#j} + P_{I,RX\#j} = \frac{\sum_{i}^{N_{TX}} \sum_{(f) \in G_{CSI\text{-}RS}}^{N_{CSI\text{-}RS}/2} |y_{TX\#i\text{-}RX\#j}(f,t) - y_{TX\#i\text{-}RX\#j}(f,t+1)|^2}{2N_{TX}N_{CSI\text{-}RS}/2} \quad [\text{Eq. 1}]$$

Herein, $G_{CSI\text{-}RS} = \{(f_x, t_y), \ldots\}$ indicates an arrangement location of the CSI-RS, $N_{CSI\text{-}RS}$ represents the number of CSI-RSs, and S represents an RS symbol.

In addition, in the case of estimating noise/interfering power with a difference between two CSI-RSs adjacent in frequency, the square of the difference between two CSI-RSs is expressed by the following equation, the term of the square of the difference in Eq.1 is replaced with the following term, and it is thereby possible to estimate noise/interfering power.

$$|y_{TX\#i\text{-}RX\#j}(f,t) - y_{TX\#i\text{-}RX\#j}(f,t+1)|^2$$

Further, in the second aspect, by setting the punctured RS symbol at "0", it is possible to estimate noise/interfering power.

Described is a wireless communication method in the radio base station apparatus and the mobile terminal device having the above-mentioned configurations. In the wireless communication method of the invention, the radio base station apparatus generates CSI-RSs, and maps the CQI-RSs to two adjacent symbols, and the mobile terminal device performs interfering power estimation using the CQI-RSs mapped to two adjacent symbols (first aspect).

More specifically, in the radio base station apparatus, as shown in FIGS. 1(*a*) and 1(*b*), the time/frequency mapping section 24 maps CSI-RSs to two symbols adjacent in time or frequency. Next, the channel multiplexing section 25 performs channel multiplexing on the shared channel signal and the CSI-RSs, and the multiplexed signal is transmitted to the mobile terminal device in downlink. At this point, when necessary, the pattern information (control information) is also transmitted to the mobile terminal device in downlink.

In the mobile terminal device, the channel dividing section 14 divides into the shared channel signal and the CSI-RSs, and the shared channel signal demodulation/decoding section 16 demodulates and decodes the shared channel signal. Meanwhile, the time/frequency demapping section demaps the CSI-RSs to extract. Then, the noise/interfering power estimation section 18 estimates noise/interfering power using the CSI-RSs, and obtains the noise/interfering power value.

Thus, in the wireless communication method of the invention, by mapping CSI-RSs to two symbols adjacent in time or frequency as a pair, the channel states in the mapping positions of respective CSI-RSs become nearly equal, and when interfering power is estimated from a difference between two CSI-RSs, it is possible to estimate interference with high accuracy.

Further, in the wireless communication method of the invention, the radio base station apparatus generates a CSI-RS, maps the CSI-RS to a particular symbol, and punctures a predetermined subcarrier in the particular symbol, and the mobile terminal device performs interfering power estimation using the CSI-RS in the particular symbol and the punctured subcarrier (second aspect).

Figure 2:
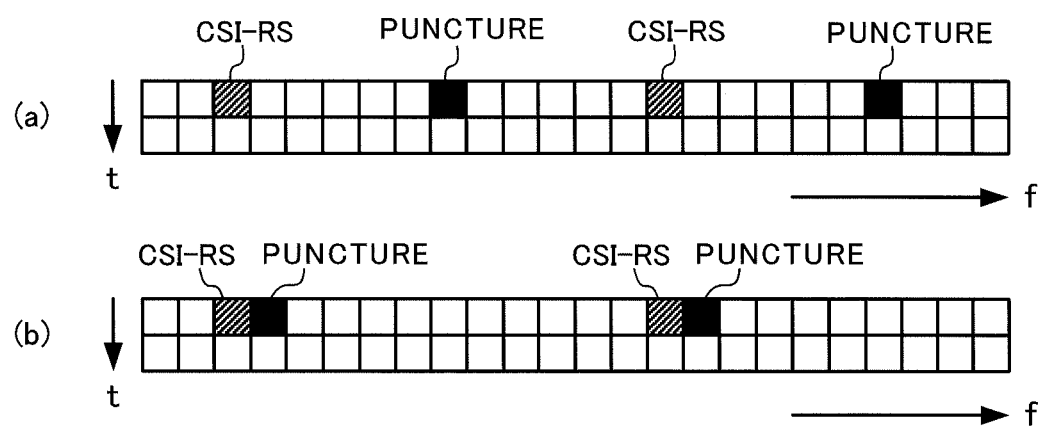
FIGS. 2(a) and 2(b) are diagrams to explain mapping of CSI-RSs according to the invention.

More specifically, as shown in FIGS. 2(*a*) and 2(*b*), the radio base station apparatus maps a CSI-RS to a particular symbol. Further, as shown in FIGS. 2(*a*) and 2(*b*), the puncture processing section 22 performs the puncture processing on the shared channel signal. Next, the channel multiplexing section 25 performs channel multiplexing on the shared channel signal and the CSI-RS, and the multiplexed signal is transmitted to the mobile terminal device in downlink. At this point, when necessary, the pattern information (control information) is also transmitted to the mobile terminal device in downlink.

In the mobile terminal device, the channel dividing section 14 divides into the shared channel signal and the CSI-RS. With respect to the shared channel signal, the depuncture processing section 15 performs the depuncture processing, and the shared channel signal demodulation/decoding section 16 performs demodulation and decoding. Meanwhile, the time/frequency demapping section 17 demaps the CSI-RS to extract. Then, the noise/interfering power estimation section 18 estimates noise/interfering power using the CSI-RS, and obtains the noise/interfering power value.

Thus, in the wireless communication method of the invention, by mapping a CSI-RS to a particular symbol, and puncturing a predetermined subcarrier in the particular symbol, it is possible to make a portion of the predetermined subcarrier a reference irrespective of the channel state, and when interfering power is estimated from a difference between two CSI-RSs, it is possible to estimate interference with high accuracy.

The invention is not limited to the aforementioned Embodiment, and is capable of being carried into practice with various modifications thereof. In the above-mentioned Embodiment, the mapping patterns and the number of transmission antennas are examples, and the invention is not limited thereto. Further, without departing from the scope of the invention, the number of processing sections and processing procedures in the above-mentioned description are capable of being carried into practice with modifications thereof as appropriate. Furthermore, each element shown in the figures represents the function, and each function block may be actualized by hardware or may be actualized by software. Moreover, the invention is capable of being carried into practice with modifications thereof as appropriate without departing from the scope of the invention.

INDUSTRIAL APPLICABILITY

The invention is useful in the radio base station apparatus, mobile terminal device and wireless communication method in the LTE-A systems.

The present application is based on Japanese Patent Application No. 2010-001139 filed on Jan. 6, 2010, entire content of which is expressly incorporated by reference herein.

The invention claimed is:

1. A radio base station apparatus comprising:
a generation section that generates channel state information reference signals corresponding to a plurality of antenna port numbers; and
a time/frequency mapping section that maps the channel state information reference signals corresponding to the antenna port numbers to two symbols adjacent in time domain and maps the channel state information reference signals corresponding to the antenna port numbers to subcarriers,
wherein the time/frequency mapping section maps channel state information reference signals of discontiguous antenna port numbers to contiguous subcarriers.

2. The radio base station apparatus according to claim 1, wherein the radio base station apparatus transmits information about mapping of the channel state information reference signals to a mobile terminal device.

3. The radio base station apparatus according to claim 1, wherein the time/frequency mapping section maps channel state information reference signals of contiguous antenna port numbers to discontiguous subcarriers.

4. A mobile terminal device comprising:
a reception section that receives a downlink signal including channel state information reference signals that correspond to antenna port numbers and are mapped to two symbols adjacent in time domain and mapped to subcarriers; and
a noise/interfering power estimation section that performs interfering power estimation using the channel state information reference signals,
wherein channel state information reference signals of discontiguous antenna port numbers are mapped to contiguous subcarriers.

5. A wireless communication system comprising:
a radio base station apparatus having:
a generation section that generates channel state information reference signals corresponding to a plurality of antenna port numbers; and
a time/frequency mapping section that maps the channel state information reference signals corresponding to the antenna port numbers to two symbols adjacent in time domain and maps the channel state information reference signals corresponding to the antenna port numbers to subcarriers; and
a mobile terminal device having:
a reception section that receives a downlink signal including the channel state information reference signals; and
a noise/interfering power estimation section that performs interfering power estimation using the channel state information reference signals,
wherein channel state information reference signals of discontiguous antenna port numbers are mapped to contiguous subcarriers.

6. The wireless communication system according to claim 5, wherein the radio base station apparatus transmits information about mapping of the channel state information reference signals to the mobile terminal device.

7. The wireless communication system according to claim 5, wherein the time/frequency mapping section maps channel state information reference signals of contiguous antenna port numbers to discontiguous subcarriers.

8. A wireless communication method comprising:
in a radio base station apparatus,
generating channel state information reference signals corresponding to a plurality of antenna port numbers; and
mapping the channel state information reference signals corresponding to the antenna port numbers to two symbols adjacent in time domain and mapping the channel state information reference signals corresponding to the antenna port numbers to subcarriers; and
in a mobile terminal device,
receiving a downlink signal including the channel state information reference signals; and
performing interfering power estimation using the channel state information reference signals,
wherein channel state information reference signals of discontiguous antenna port numbers are mapped to contiguous subcarriers.

9. The wireless communication method according to claim 8, wherein the radio base station apparatus transmits information about mapping of the channel state information reference signals to the mobile terminal device.

10. The wireless communication method according to claim 8, wherein the radio base station apparatus maps channel state information reference signals of contiguous antenna port numbers to discontiguous subcarriers.

* * * * *